United States Patent
Mazo

(10) Patent No.: US 7,209,481 B2
(45) Date of Patent: Apr. 24, 2007

(54) SYSTEM AND METHOD FOR AUTOMATED NETWORK ADDRESS CLONING FOR ROUTERS

(75) Inventor: Joel S. Mazo, Lake Forest, CA (US)

(73) Assignee: Gateway Inc., Irvine, CA (US)

( * ) Notice: Subject to any disclaimer, the term of this patent is extended or adjusted under 35 U.S.C. 154(b) by 1002 days.

(21) Appl. No.: 10/128,063

(22) Filed: Apr. 23, 2002

(65) Prior Publication Data

US 2003/0147404 A1 Aug. 7, 2003

(51) Int. Cl.
*H04L 12/56* (2006.01)

(52) U.S. Cl. .................................... 370/389

(58) Field of Classification Search ............. 370/389, 370/400, 352, 463, 419, 216; 709/245, 250
See application file for complete search history.

(56) References Cited

U.S. PATENT DOCUMENTS

| | | | | |
|---|---|---|---|---|
| 6,006,272 | A | 12/1999 | Aravamudan et al. | 709/245 |
| 6,028,848 | A * | 2/2000 | Bhatia et al. | 370/257 |
| 6,070,187 | A | 5/2000 | Subramaniam et al. | 709/220 |
| 6,230,231 | B1 | 5/2001 | DeLong et al. | 711/3 |
| 6,262,988 | B1 | 7/2001 | Vig | 370/401 |
| 6,282,201 | B1 | 8/2001 | Alexander, Jr. et al. | 370/401 |
| 6,282,579 | B1 | 8/2001 | Carre | 709/313 |
| 6,931,018 | B1 * | 8/2005 | Fisher | 370/401 |

OTHER PUBLICATIONS

SMC Barricade Cable/DSL Router—SMC Networks, Inc.
Network Downtime on Profits and Productivity—Performance Technologies, Inc.

* cited by examiner

*Primary Examiner*—Derrick W. Ferris
(74) *Attorney, Agent, or Firm*—Jeffrey A. Proehl; Woods, Fuller Shultz & Smith

(57) ABSTRACT

The present invention is directed to a system and method for automated network address cloning. A method for cloning a network address for access of content by a router may include determining whether the router may access a service provider. A network address of a network connection device is obtained if the router is unable to access the service provider, the network connection device included in a client information handling system communicatively coupled to the router. The obtained network address of the information handling system is cloned to a router address automatically and without user intervention.

29 Claims, 6 Drawing Sheets

SYSTEM AND METHOD FOR AUTOMATED NETWORK ADDRESS CLONING FOR ROUTERS

FIELD OF THE INVENTION

The present invention generally relates to the field of networked environments, and particularly to a system and method for automated network address cloning, such as medium access control (MAC) addresses and the like.

BACKGROUND OF THE INVENTION

Networks and network access have become ever more prevalent with the increase in the types and varieties of information handling systems. For example, previously, home users of information handling systems shared a single information handling system. However, with the decreased costs and the targeted functionality that may now be found in information handling systems, a variety of information handling systems may be utilized in a given environment, such as a home, office, and the like. Therefore, users are more apt to have a range of information handling systems.

To connect these information handling systems together to enable shared functionality and file access, a network may be used. A network enables multiple users to share a resource, such as an Internet connection, through use of a router. However, some Internet service providers require a specific network address, such as a media access control (MAC) address, network card address, and the like, in order to connect to the service. Therefore, if a user wished to upgrade from a single information handling system to multiple information handling systems, including installing a home network with shared access to an Internet service provider, configuration of the network and the networking devices was complicated. For instance, a broadband modem may be provided to access an Internet service provider (ISP). However, in many instances, if the broadband modem does not receive a network address for the device as previously registered, the modem will not permit access to the content. Such a situation may be confusing to a consumer, and may cause a great deal of effort to correct, even if the problem is recognized. Therefore, consumers may be less likely to purchase additional information handling systems and upgrade network services.

SUMMARY OF THE INVENTION

Accordingly, the present invention is directed to a system and method for automated network address cloning. In a first aspect of the present invention, a method for cloning a network address for access of content by a router includes determining whether the router may access a service provider. A network address of a network connection device is obtained if the router is unable to access the service provider, the network connection device included in a client information handling system communicatively coupled to the router. The obtained network address of the information handling system is cloned to a router address automatically and without user intervention.

In a second aspect of the present invention, a system includes a router and at least one client information handling system communicatively coupled to the router. The router is suitable for passing electronic data to an indicated destination and is coupled over a network to a content service provider, the content service provider suitable for providing content over the network. The information handling system includes a network connection device having a network address. In which, accessing the content service provider requires a network address not included on the router, the network address of the at least one client information handling system is obtained automatically and without user intervention, the network address of the at least one client information handling system cloned by the router.

In a third aspect of the present invention, a system includes a router and at least one client information handling system communicatively coupled to the router. The router is suitable for passing electronic data to an indicated destination and is coupled over a first network to a content service provider. The content service provider is suitable for providing content over the network. The information handling system includes a network connection device having a network address. The router provides access by the at least one client information handling system to the content service provider over the first network. In which, accessing the content service provider requires a network address not included on the router, the network address of the at least one client information handling system is obtained automatically and without user intervention, the network address of the at least one client information handling system cloned by the router.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown. To connect over some networks, such as to an Internet service provider, a specific network address is needed in order to access the network. However, a user may wish to utilize different connection equipment which does not have the specific network address, such as when adding a router to a local area network, to enable such access to be shared. When encountered with such a situation, a typical consumer may not recognize the problem, and even if the problem is recognized, require the consumer to engage in a lengthy process which is prone to error. By utilizing the present invention, a system and method are provided for automatically cloning a network address so that access to a network, as well as the configuration of a network, may be performed in a user-friendly and efficient manner.

Figure 1:
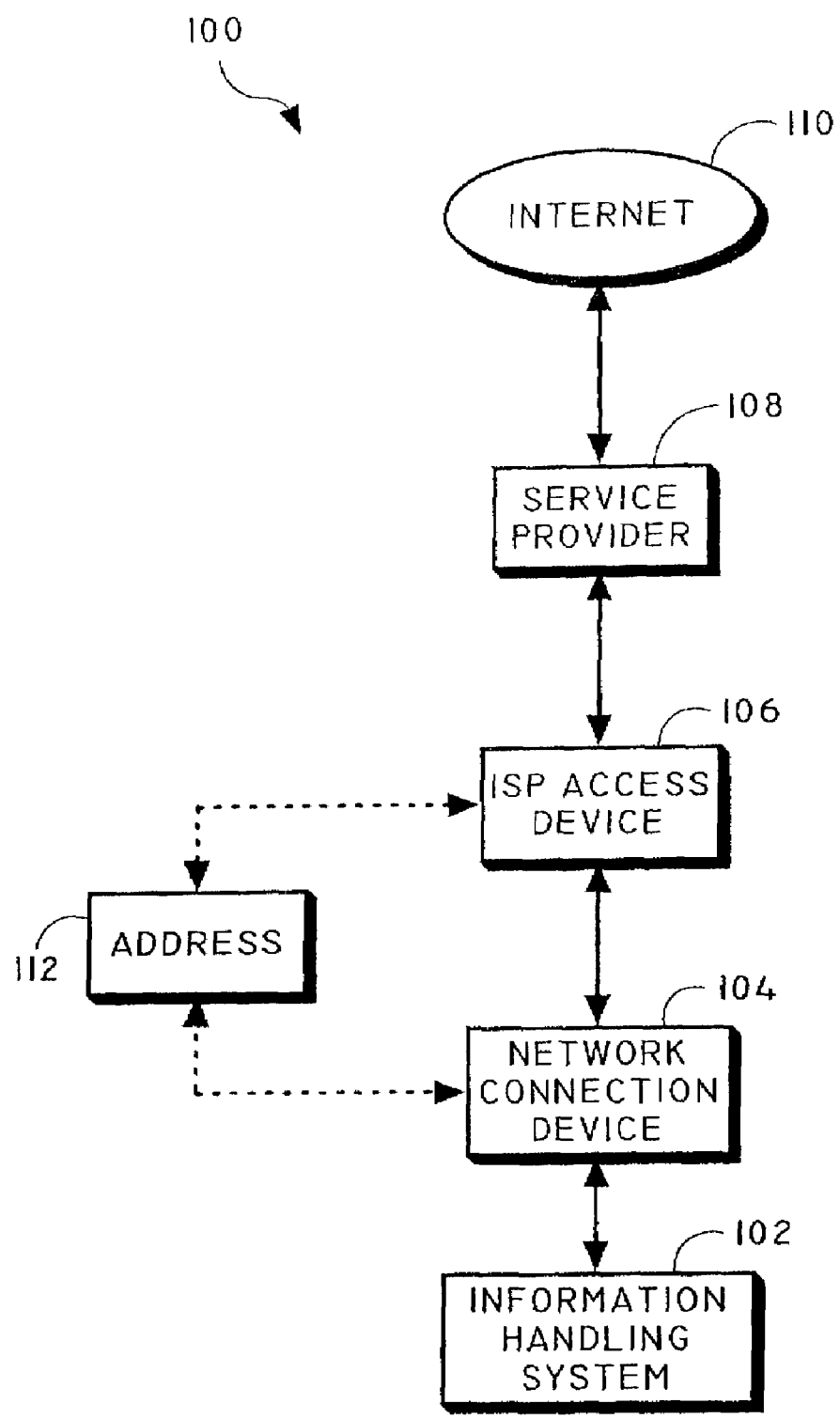
FIG. 1 is an illustration of an embodiment of the present invention wherein an information handling system connects to a service provider utilizing a specific network address.

Referring now to FIG. 1, an embodiment 100 of the present invention is shown wherein an information handling system connects to a service provider utilizing a specific network address. An information handling system 102, such as a convergence system, desktop computer, laptop, personal digital assistant, digital information application, Internet appliance, and the like, may include a network connection device 104. The network connection device 104 may include a network card, network interface card, and the like as contemplated by a person of ordinary skill in the art.

The network connection device 104 is connected to an ISP access device 106, which is suitable for communicating with a service provider 108 to send and receive data. For instance, a service provider access device 106 may include a cable modem, digital subscriber line (DSL) router, and the like as contemplated by a person of ordinary skill in the art. The service provider 108 may include an Internet service provider capable of supplying content to a user from over the Internet 110.

In some instances, service providers 108 require a specific network address 112, such as a media access control (MAC) address, network card address, and the like, in order to access connect from the service. Such a specific network address may have been obtained by the provider when a user registered for access. However, a user may wish to upgrade and/or change a system connected to the service provider 108. Therefore, the user may be confronted with a situation that is not fully understood, thereby resulting in a great deal of user frustration and a large time requirement in correcting the set-up.

Figure 2:
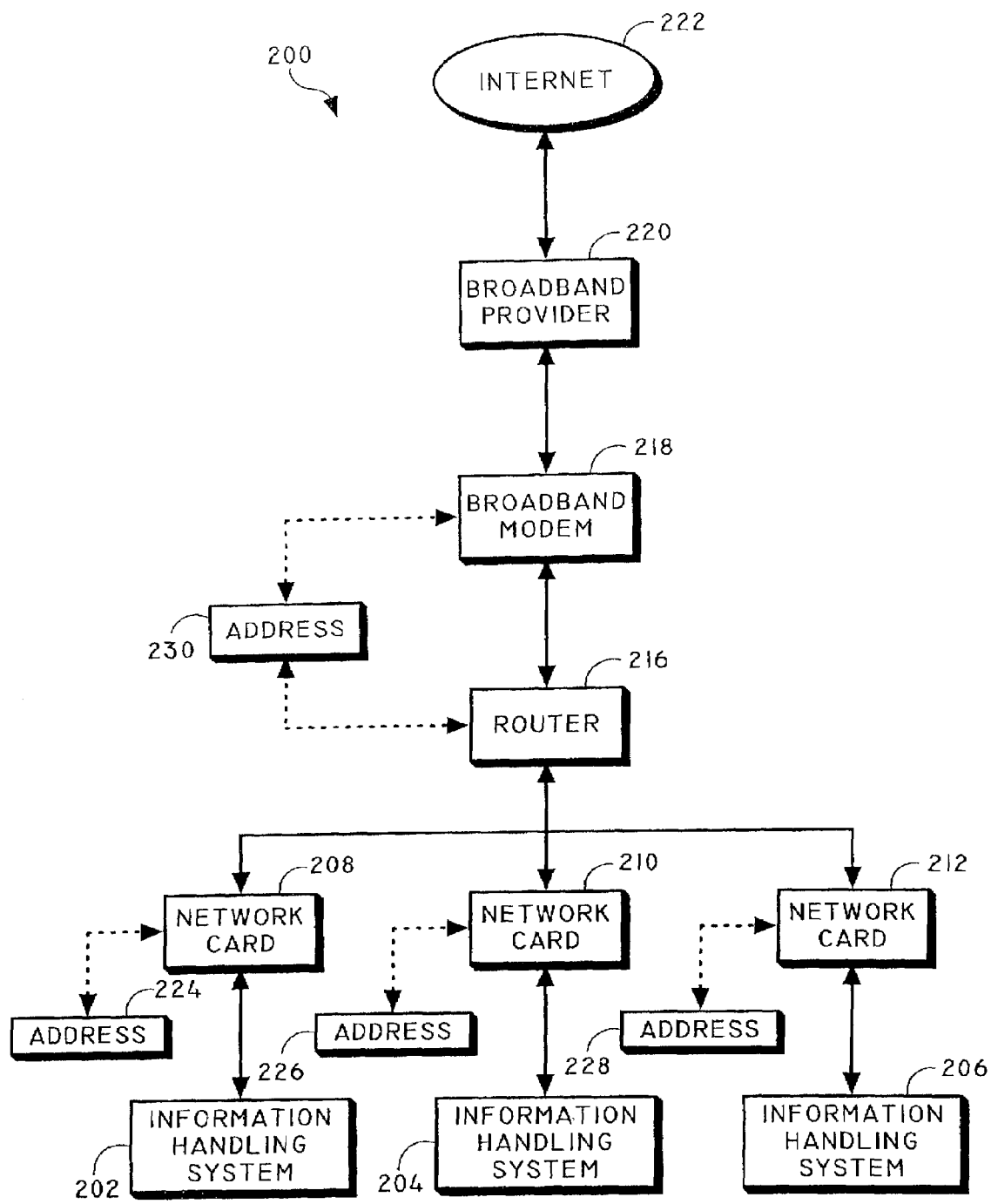
FIG. 2 is an illustration of an embodiment of the present invention wherein a system of FIG. 1 is upgraded to include a router and multiple information handling systems.

For example, as shown in the embodiment 200 depicted in FIG. 2, a user may upgrade the system of FIG. 1 to include multiple information handling systems. A first information handling system 202, a second information handling system 204 and a third information handling system 206 include network cards 208, 210 & 212 for accessing a local area network 214. The network cards enable communication between the information handling systems 202, 204 & 206, as well as with a router 216 to obtain Internet access 222. A router 216 may include a piece of hardware and/or software, such as a gateway, that connects two or more networks, and may function as a sorter and interpreter to address and pass bits of information to corresponding destinations. The router 216 may be connected to a service provider access device, in this instance a broadband modem 218 to access a broadband provider 220, and thus, the Internet 222.

As previously stated, some service providers require a specific network address, so that, if the original network connection device is not attached to the broadband modem 218, the user will not be able to access the provider 220. Thus, a router 216 added for networking purposes would not be able to access the provider. However, the present invention enables a network address to be obtained, so that the router may access the provider, such as from client information handling systems 202, 204 & 206, previously utilized routers, and the like as contemplated by a person of ordinary skill in the art.

For instance, network addresses 224, 226 & 228 may be obtained from network cards 208, 210 & 212 and cloned by the router 216 so that the router 216 may provide a network address 230 that was previously utilized for accessing the broadband modem 218 and provider 220. Thus, the router 216 may mimic a previously utilized network address used to register with the provider, giving the broadband provider the impression that the router is the network connection device. In this way, a user may add additional information handling systems via ports of the router. By utilizing the present invention, the network address may be cloned automatically and without user intervention, thereby alleviating the user from the arduous task of obtaining a network address and configuring the router manually.

Figure 3:
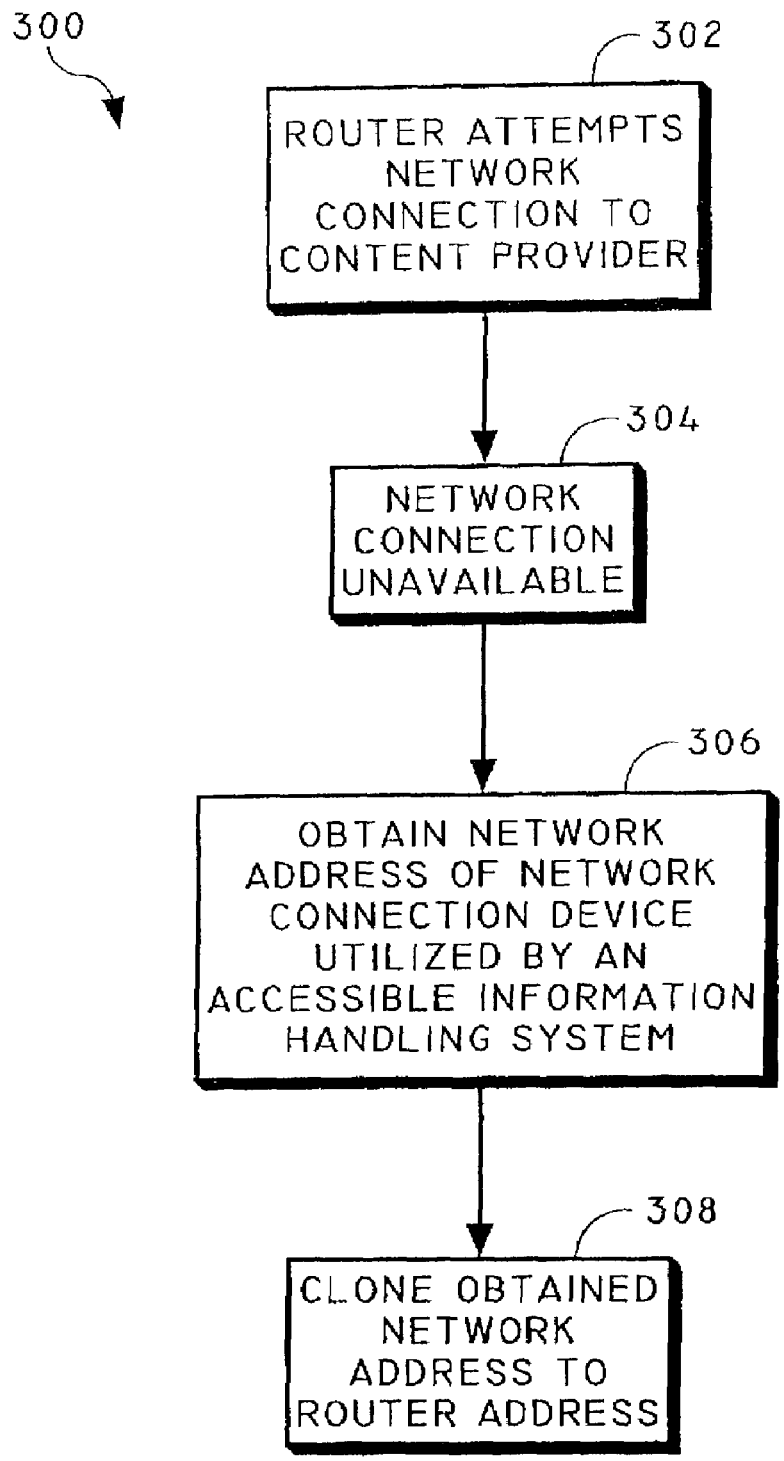
FIG. 3 is a flow diagram depicting an exemplary method of the present invention wherein in response to a failed attempt to gain a network connection, a network address is obtained and cloned.

Referring now to FIG. 3, an exemplary method 300 of the present invention is shown wherein in response to a failed attempt to gain a network connection, a network address is obtained and cloned. A router attempts to obtain a network connection to a content provider 302, but the network connection is unavailable 304.

In response to the unavailability of the network connection, a network address of a network connection device utilized by an accessible information handling system is obtained 306. The obtained network address is then cloned to the router address 308 to provide the content provider the necessary data. Thus, the service provided views a connection having a network address as previously encountered, while the user is able to connect multiple information handling systems to share content access.

Figure 4:
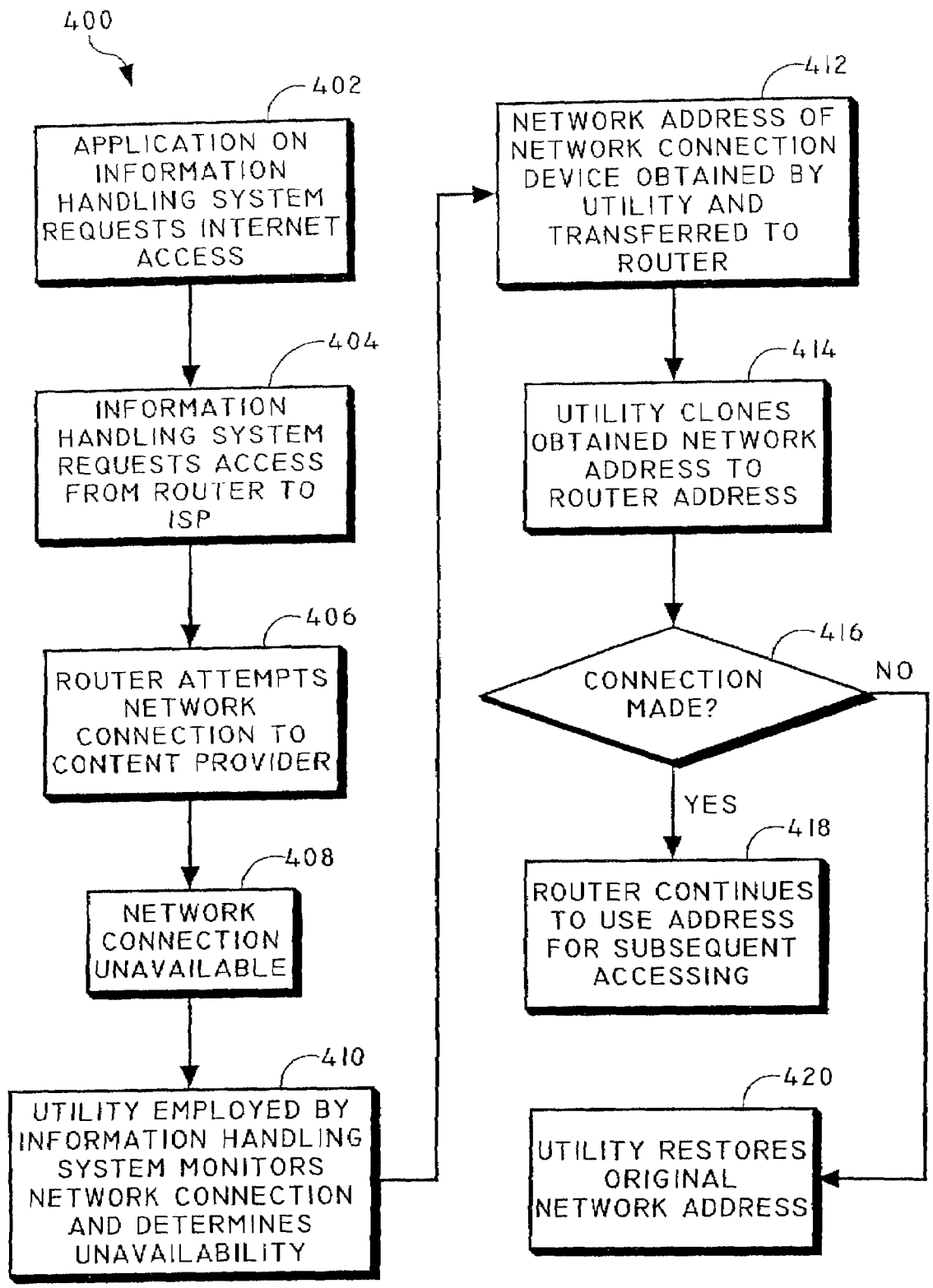
FIG. 4 is a flow diagram illustrating an exemplary method of the present invention wherein a utility employed by an information handling system clones a network address of the information handling system to a router.

Referring now to FIG. 4, an exemplary method 400 of the present invention is shown wherein a utility employed by an information handling system clones a network address of the information handling system to a router. A utility may be provided which operates on an information handling system which may clone a network address as needed. For example, an application on an information handling system requests Internet access 402, and thus, the information handling system requests access through a router to an ISP utilizing a network connection device. The router attempts to gain a network connection to the content provider 406, but the network connection is unavailable 408.

A utility, employed by the information handling system, monitors the network connection and determines unavailability 410. The utility may determine unavailability of the network connection due to network address. Therefore, a network address of a network connection device is obtained by the utility and transferred to the router 412. The utility clones the obtained network address to the router address 414. If a connection is then made successfully 416, the router may continue to use the address for subsequent accessing 418. However, if the connection is not successful 416, the utility may restore the original network address to the router 420. In this way, an information handling system may provide the network address to the router automatically and without user intervention, and may be done with routers not having this functionality. Therefore, pre-existing and legacy routers may be utilized through use of a utility of the present invention to provide a network connection in a user friendly manner. Although a utility has been described which operates on an information handling system, a router may also employ the utility without departing from the spirit and scope of the present invention.

Figure 5:
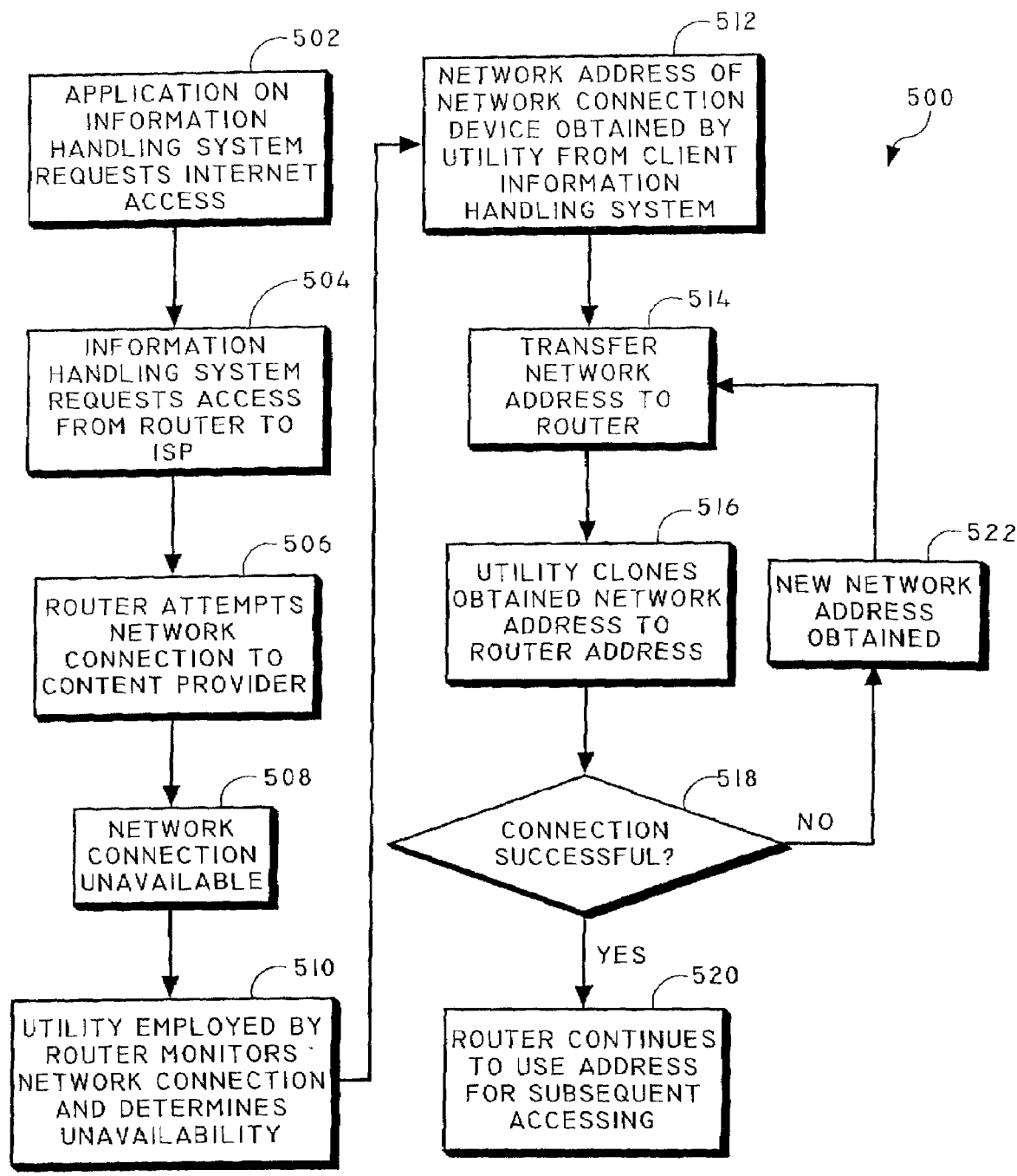
FIG. 5 is a flow diagram of an exemplary method of the present invention wherein a utility is employed by a router to clone a network address of an information handling system communicatively coupled to the router.

For examples, as shown in the exemplary method 500 depicted in FIG. 5, a utility may be employed by a router to clone a network address of an information handling system communicatively coupled to the router. An application operating on an information handling system requests Internet access 502. The information handling system requests access from a router to an ISP 504 utilizing a service provider access device, such as a broadband modem. The router attempts the network connection 506, but the network connection is unavailable 508 because the network address of the router does not match a previously registered network address.

A utility employed by the router monitors the attempted network connection and determines unavailability 510. The utility obtains a network address from a network connection device included with a client information handling system 512. For instance, as shown in FIG. 2, the router may obtain addresses 224, 226, 228 from network cards 208, 210 & 212 included with client information handling systems 202, 204 & 206. The network address is transferred to the router 514 and the utility clones the obtained network address to the router address 516. If a connection is successful 518, the router may continue to use the address for subsequent accessing 520.

However, if the connection is not successful 518, a new network address may be obtained 522 from a client information handling system and the process continued for each available network address until a connection is successful. In this way, a utility of the present invention may avail itself of all accessible network addresses in an effort to gain a network connection.

Figure 6:
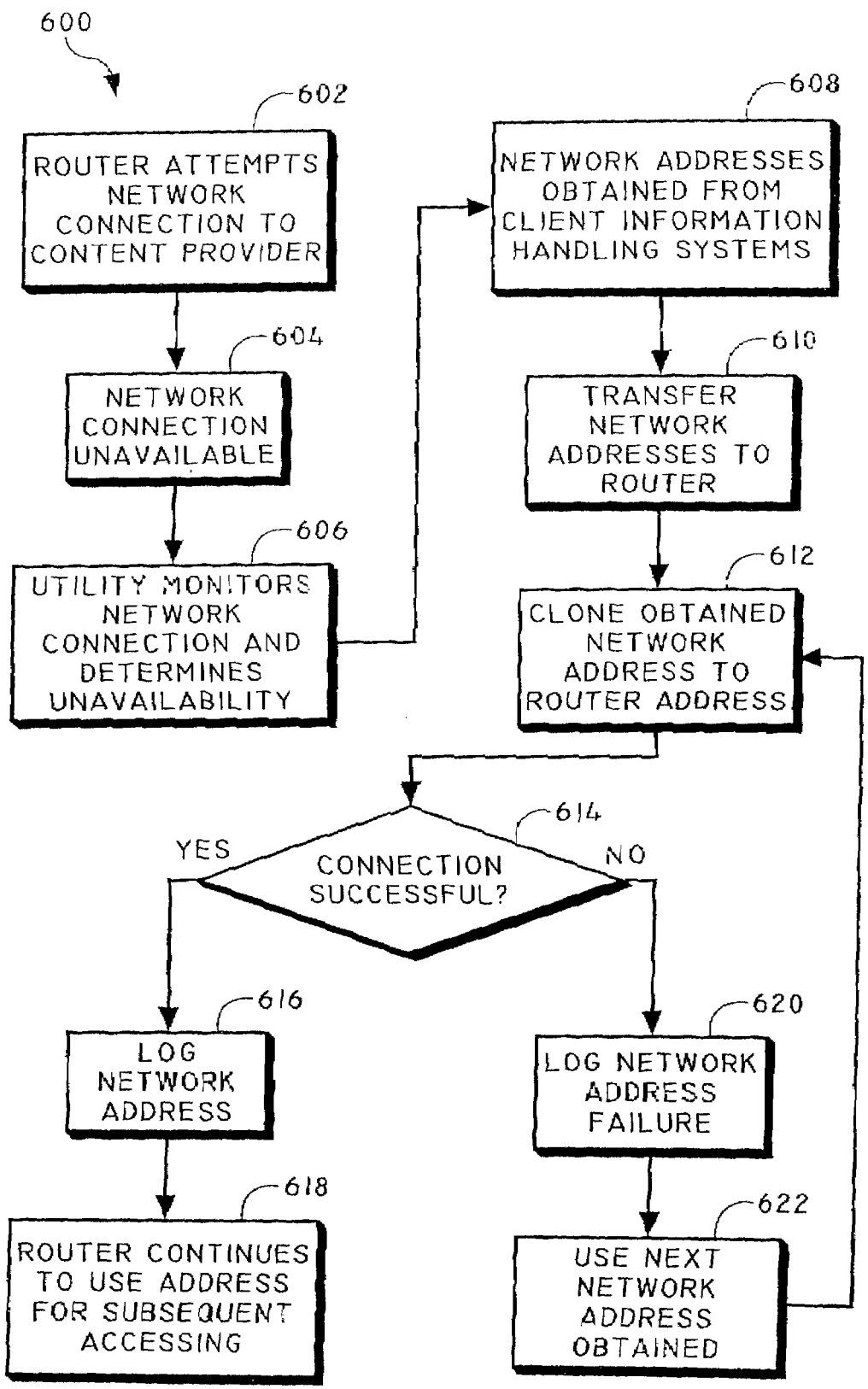
FIG. 6 is a flow diagram of an exemplary method of the present invention wherein a log is employed to track use of network addresses.

Referring now to FIG. 6, an exemplary method 600 of the present invention is shown wherein network addresses are logged, the network addresses suitable for being utilized to access a service provider. A network address log may be utilized in accordance with the present invention to track available network addresses. For example, as before, if a router attempts a connection to a content provider 602, and the network connection is unavailable 604, a utility may monitor this unavailability 606 and obtain network addresses from client information handling systems 608. Network addresses may then be transferred to the router 610. It should be noted, that in this instance, network addresses are obtained from multiple client information handling systems.

A network address of the obtained network addresses is cloned to the router address 612. If a connection is successful 614, the network address is logged as successful, and the router continues to use the address for subsequent accessing 618. However, if the connection is not successful 614, the network address failure is logged 620, and the next network address obtained is used. In this way, an accurate log may be maintained which indicates successful address use, so that if one previously successful address is no longer functional, an additional network address may be chosen in an efficient manner.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more information handling systems, which may include memory for storing a program of instructions and a processor for performing the program of instruction, wherein the program of instructions configures the processor and information handling system. Until required by the information handling system, the set of instructions may be stored in another readable memory device, for example in a hard disk drive or in a removable medium such as an optical disc for utilization in a CD-ROM drive and/or digital video disc (DVD) drive, a compact disc such as a compact disc-rewriteable (CD-RW), compact disc-recordable and erasable; a floppy disk for utilization in a floppy disk drive; a floppy/optical disc for utilization in a floppy/optical drive; a memory card such as a memory stick, personal computer memory card for utilization in a personal computer card slot, and the like. Further, the set of instructions can be stored in the memory of an information handling system and transmitted over a local area network or a wide area network, such as the Internet, when desired by the user.

Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method for cloning a network address of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for cloning a network address for access of content by a router, comprising:
   determining whether the router may access a service provider;
   obtaining a network address of a network connection device included in a client information handling system communicatively coupled to the router if the router is unable to access the service provider; and
   cloning the obtained network address of the information handling system to a router address automatically and without user intervention;
   wherein the obtained network address is a media access control address.

2. The method as described in claim 1, wherein the router is suitable for passing electronic data to an indicated destination of a plurality of information handling systems.

3. The method as described in claim 1, wherein the network address is included in a network connection device of the information handling system.

4. The method as described in claim 3, wherein the network connection device is a network card.

5. The method as described in claim 1, wherein the service provider is an Internet service provider and the router is coupled to a service provider access device including at least one of a broadband modem, cable mode and digital subscriber line router for accessing the Internet service provider.

6. The method as described in claim 1, further comprising a log suitable for logging at least one of success and failure of a network address when accessing the service provider.

7. The method as described in claim 1, wherein cloning includes utilizing the obtained network address of the client information handling system by the router as the network of the router.

8. The method as described in claim 1, wherein cloning includes assuming the obtained network address of the client information handling system by the router.

9. A method for cloning a network address for access of content by a router, comprising:
   determining whether the router may access a service provider;
   obtaining a network address of a network connection device included in a client information handling system communicatively coupled to the router if the router is unable to access the service provider;
   cloning the obtained network address of the information handling system to a router address automatically and without user intervention; and
   wherein determining includes attempting to initiate a network connection to the service provider by the router, wherein in response to a failed attempt, the network address of the client information handling system is obtained.

10. A method for cloning a network address for access of content by a router, comprising:
    determining whether the router may access a service provider;
    obtaining a network address of a network connection device included in a client information handling system communicatively coupled to the router if the router is unable to access the service provider;
    cloning the obtained network address of the information handling system to a router address automatically and without user intervention; and
    wherein the network address is a MAC address.

11. A method for cloning a network address for access of content by a router, comprising:
    determining whether the router may access a service provider;
    obtaining a network address of a network connection device included in a client information handling system communicatively coupled to the router if the router is unable to access the service provider;
    cloning the obtained network address of the information handling system to a router address automatically and without user intervention; and
    wherein the cloned network address is unsuccessful in use for accessing the service provider, a second network address is obtained from a second client information handling system.

12. A system, comprising:
    a router suitable for passing electronic data to an indicated destination, the router coupled over a network to a content service provider, the content service provider suitable for providing content over the network; and
    at least one client information handling system communicatively coupled to the router, the information handling system including a network connection device having a network address;
    wherein accessing the content service provider requires a network address not included on the router, the network address of the at least one client information handling system is obtained automatically and without user intervention, the network address of the at least one client information handling system cloned by the router;
    wherein the cloned network address of the at least one client information handling system becomes the network address of the router.

13. The system as described in claim 12, wherein the network address is obtained by a utility operating on the router.

14. The system as described in claim 12, wherein the network address is obtained by a utility operating on the client information handling system.

15. The system as described in claim 12, wherein the router is suitable for passing electronic data to an indicated destination of a plurality of information handling systems.

16. The system as described in claim 12, wherein the network connection device is a network card.

17. The system as described in claim 12, wherein the router is coupled to a service provider access device including at least one of a broadband modem, cable mode and digital subscriber line router for accessing the service provider.

18. The system as described in claim 12, wherein a log is maintained suitable for logging at least one of success and failure of a network address when accessing the service provider.

19. A system comprising
    a router suitable for passing electronic data to an indicated destination, the router coupled over a network to a content service provider, the content service provider suitable for providing content over the network;
    at least one client information handling system communicatively coupled to the router, the information handling system including a network connection device having a network address;
    wherein accessing the content service provider requires a network address not included on the router, the network address of the at least one client information handling system is obtained automatically and without user intervention, the network address of the at least one client information handling system cloned by the router; and
    wherein the network address is a MAC address.

20. A system comprising
    a router suitable for passing electronic data to an indicated destination, the router coupled over a network to a content service provider, the content service provider suitable for providing content over the network; and
    at least one client information handling system communicatively coupled to the router, the information handling system including a network connection device having a network address;
    wherein accessing the content service provider requires a network address not included on the router, the network address of the at least one client information handling system is obtained automatically and without user intervention, the network address of the at least one client information handling system cloned by the router;

wherein the cloned network address is unsuccessful in use for accessing the service provider, a second network address is obtained from a second client information handling system.

21. A system, comprising:

a router suitable for passing electronic data to an indicated destination, the router coupled over a first network to a content service provider, the content service provider suitable for providing content over the network; and at least one client information handling system communicatively coupled to the router over a second network, the router providing access by the at least one client information handling system to the content service provider over the first network, the information handling system including a network connection device having a network address;

wherein accessing the content service provider requires a network address not included on the router, the network address of the at least one client information handling system is obtained automatically and without user intervention, the network address of the at least one client information handling system cloned by the router;

wherein the cloned network address of the at least one client information handling system becomes the network address of the router.

22. The system as described in claim 21, wherein the network address is obtained by a utility operating on the router.

23. The system as described in claim 21, wherein the network address is obtained by a utility operating on the client information handling system.

24. The system as described in claim 21, wherein the router is suitable for passing electronic data to an indicated destination of a plurality of information handling systems.

25. The system as described in claim 21, wherein the network connection device is a network card.

26. The system as described in claim 21, wherein the router is coupled to a service provider access device including at least one of a broadband modem, cable mode and digital subscriber line router for accessing the service provider.

27. The system as described in claim 21, wherein a log is maintained suitable for logging at least one of success and failure of a network address when accessing the service provider.

28. A system comprising:

a router suitable for passing electronic data to an indicated destination, the router coupled over a first network to a content service provider, the content service provider suitable for providing content over the network;

at least one client information handling system communicatively coupled to the router over a second network, the router providing access by the at least one client information handling system to the content service provider over the first network, the information handling system including a network connection device having a network address;

wherein accessing the content service provider requires a network address not included on the router, the network address of the at least one client information handling system is obtained automatically and without user intervention, the network address of the at least one client information handling system cloned by the router; and wherein the network address is a MAC address.

29. A system comprising:

a router suitable for passing electronic data to an indicated destination, the router coupled over a first network to a content service provider, the content service provider suitable for providing content over the network;

at least one client information handling system communicatively coupled to the router over a second network, the router providing access by the at least one client information handling system to the content service provider over the first network, the information handling system including a network connection device having a network address;

wherein accessing the content service provider requires a network address not included on the router, the network address of the at least one client information handling system is obtained automatically and without user intervention, the network address of the at least one client information handling system cloned by the router; and wherein the cloned network address is unsuccessful in use for accessing the service provider, a second network address is obtained from a second client information handling system.

* * * * *